(12) United States Patent
Kageyama

(10) Patent No.: US 10,675,918 B2
(45) Date of Patent: Jun. 9, 2020

(54) PNEUMATIC TIRE

(71) Applicant: Sumitomo Rubber Industries, Ltd., Kobe-shi, Hyogo (JP)

(72) Inventor: Naoki Kageyama, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 349 days.

(21) Appl. No.: 15/452,279

(22) Filed: Mar. 7, 2017

(65) Prior Publication Data

US 2017/0267034 A1    Sep. 21, 2017

(30) Foreign Application Priority Data

Mar. 18, 2016 (JP) .................................. 2016-55867

(51) Int. Cl.
*B60C 13/02* (2006.01)
*B60C 13/00* (2006.01)

(52) U.S. Cl.
CPC ............ *B60C 13/02* (2013.01); *B60C 13/002* (2013.01); *B60C 13/023* (2013.01); *B60C 2200/14* (2013.01)

(58) Field of Classification Search
CPC ...................................................... B60C 13/02
See application file for complete search history.

(56) References Cited

U.S. PATENT DOCUMENTS

2017/0057295 A1* 3/2017 Kageyama ............. B60C 11/11
2019/0016179 A1* 1/2019 Yamakawa ......... B60C 11/1236

FOREIGN PATENT DOCUMENTS

JP       2004291937 A  * 10/2004 ............. B60C 13/02
JP       2012-6449 A       1/2012
WO    WO-2015146823 A1 * 10/2015 ............. B60C 11/11

* cited by examiner

Primary Examiner — Robert C Dye
Assistant Examiner — Asha A Thomas
(74) Attorney, Agent, or Firm — Birch, Stewart, Kolasch & Birch, LLP

(57) ABSTRACT

A pneumatic tire comprises a sidewall portion provided in its radially outer region B with side protectors protruding axially outwardly from the outer surface Ba of the radially outer region B. The side protectors are arranged in the tire circumferential direction at intervals so that grooved portions are formed between the side protectors. The width W1 in the tire circumferential direction of the grooved portion is in a range of from 50% to 70% of the width W2 in the tire circumferential direction of the side protector when measured at the same radial position.

9 Claims, 5 Drawing Sheets

PNEUMATIC TIRE

TECHNICAL FIELD

The present invention relates to a pneumatic tire improved in the durability of the bead portions, off-road performance, and cut resistance performance in a good balance.

BACKGROUND ART

Pneumatic tires to be used with a four-wheel drive vehicle and the like are required to have good rock performance (or running performance on rocky ground) and good mud performance (or running performance on muddy ground). Hereinafter, these performances are comprehensively referred to as off-road performance.

On the other hand, a pneumatic tire which is, in order to improve the cut resistance of the sidewall portions, provided in the sidewall portions with axially outwardly protruding side protectors has been proposed. Such side protectors can exert tractional force by the engagement and friction between the side protectors and rocks on the rocky ground as well as by the shearing of the mud entered into reentrant portions formed between the side protectors. Thus, the off-road performance can be improved.

In order that the off-road performance and cut resistance performance are improved, if the side protectors are increased in the protruding height, then the tire sidewall portion is increased in the rubber volume in its radially outer region especially. Therefore, there are problems such that the weight of the tire is unfavorably increased, and the durability of the bead portion of the tire is deteriorated because the flexural stress of the sidewall portion concentrates in a region from the lower sidewall region to the bead portion.

Prior Art Document

Japanese Patent application Publication No. 2012-006449

SUMMARY OF THE INVENTION

The present invention was made in light of the problems described above, and a primary object of the present invention is to provide a pneumatic tire which is improved in the durability of the bead portion, off-road performance and cut resistance performance in a good balance.

According to the present invention, a pneumatic tire comprises a sidewall portion provided in its radially outer region with side protectors protruding axially outwardly from the outer surface of the radially outer sidewall region, the side protectors arranged in the tire circumferential direction at intervals so that a grooved portion is formed between every two of the circumferentially adjacent side protectors, wherein a length in the tire circumferential direction of the above-said grooved portion is in a range of from 50% to 70% of a length in the tire circumferential direction of each of the side protectors on both sides of the above-said grooved portion when the lengths are measured at the same radial position.

In the pneumatic tire according to the present invention, it is preferable that each of the grooved portions is provided with a projection which, in a tire meridian section including the projection, has a substantially triangular shape having an apex projecting axially outwardly.

It is preferable that the distance in the tire radial direction between the above-said apex and the tread edge is in a range from 20 to 50 mm.

It is preferable that the apex of the above-said projection extends continuously in the tire circumferential direction between the two side protectors on both sides of the projection.

It is preferable that the above-said projection has a protruding height in the above-said tire meridian section including the projection which is less than the protruding height of the side protector on each side thereof in a tire meridian section including the side protector.

It is preferable that the protruding height of the projection is in a range from 2 to 8 mm.

In the pneumatic tire according to the present invention, it is preferable that the protruding heights of the side protectors are in a range from 5 to 10 mm.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

The tread edges Te are the axial outermost edges of the ground contacting patch of the tire which occurs under the normally inflated loaded condition when the camber angle of the tire is zero.

The tread width TW is the width measured under the normally inflated unloaded condition, as the axial distance between the tread edges Te determined as above.

The protruding heights of the side protector and the projection are those measured from the smooth contour line S of the radially outer sidewall region from which concavity and convexity for ornamental purposes or for presenting marks, characters and the like are excluded.

DESCRIPTION OF THE PREFERRED EMBODIMENT

Figure 1:
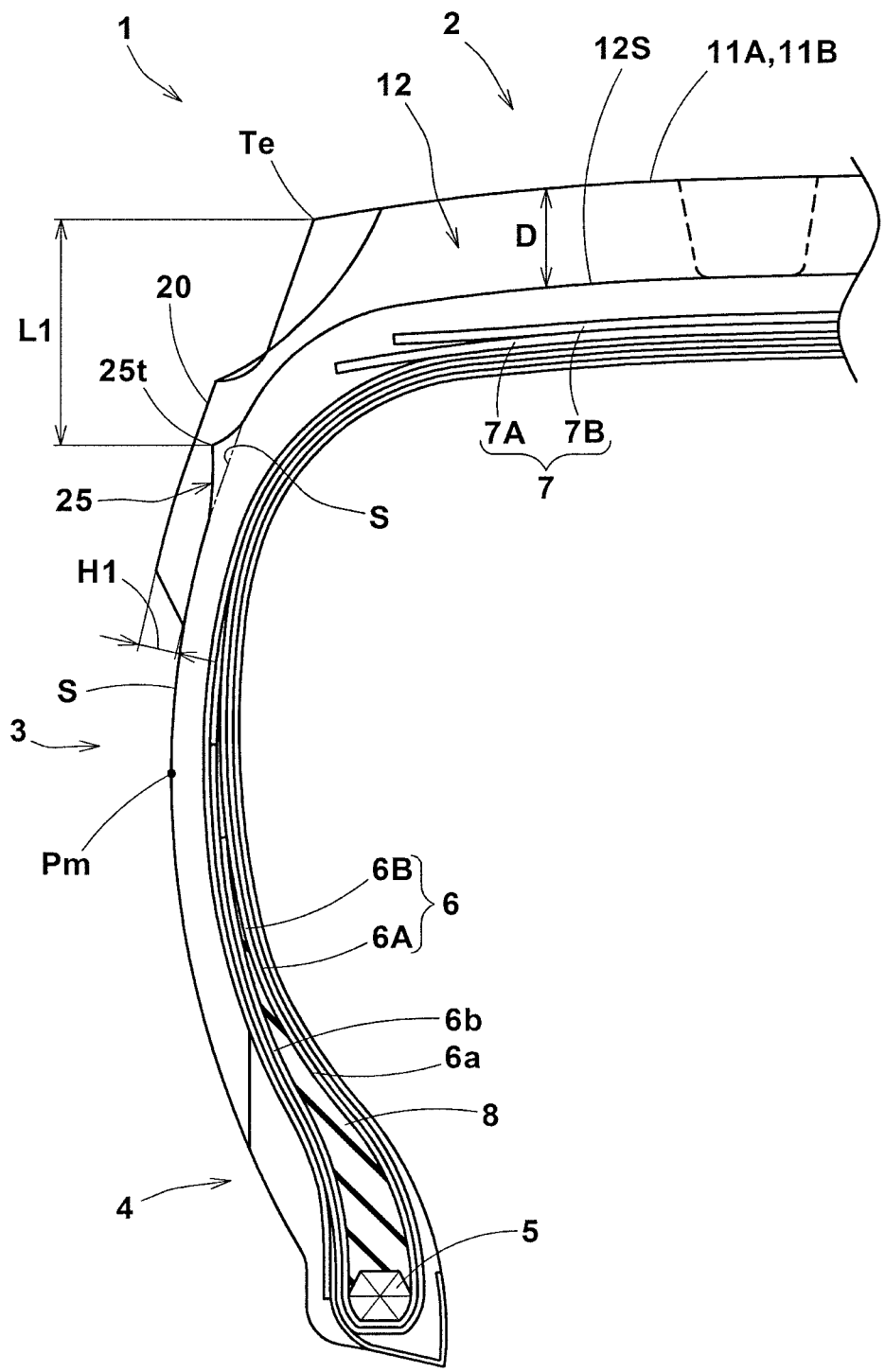
FIG. 1 is a cross-sectional partial view of a pneumatic tire as an embodiment of the present invention under the nor

The present invention is suitably applied to all-season tires for four-wheel-drive vehicles such as SUV.

Taking an all-season tire as an example, an embodiment of the present invention will now be described with reference to the accompanying drawings.

In the drawings, pneumatic tire 1 as an embodiment of the present invention comprises a tread portion 2, a pair of axially spaced bead portions 4 each with a bead core 5 therein, a pair of sidewall portions 3 extending between the tread edges Te and the bead portions 4, a toroidal carcass 6 extending between the bead portions 4 through the tread portion 2 and the sidewall portions 3, and a tread reinforcing belt 7 disposed radially outside the carcass 6 in the tread portion 2.

The carcass 6 is composed of at least one ply (in this embodiment, two plies 6A, 6B) of cords arranged at an angle in a range from 70 to 90 degrees with respect to the tire circumferential direction for example, and extending between the bead portions 4 through the tread portion 2 and the sidewall portions 3, and further turned up around the bead core 5 in each of the bead portions so as to form a pair of turned up portions 6b and a toroidal main portion 6a therebetween.

Each of the bead portions 4 in this example is provided with a bead apex rubber 8 extending radially outwardly from the bead core 5 through the space between the main portion 6a and turnup portion 6b in order to reinforce the bead portion.

The belt 7 is composed of at least one ply (in this embodiment, two cross plies 7A, 7B) of cords laid at an angle in a range from 10 to 45 degrees with respect to the tire circumferential direction for example.

Incidentally, the carcass 6 and the belt 7 are not limited to the above described structures.

Figure 2:
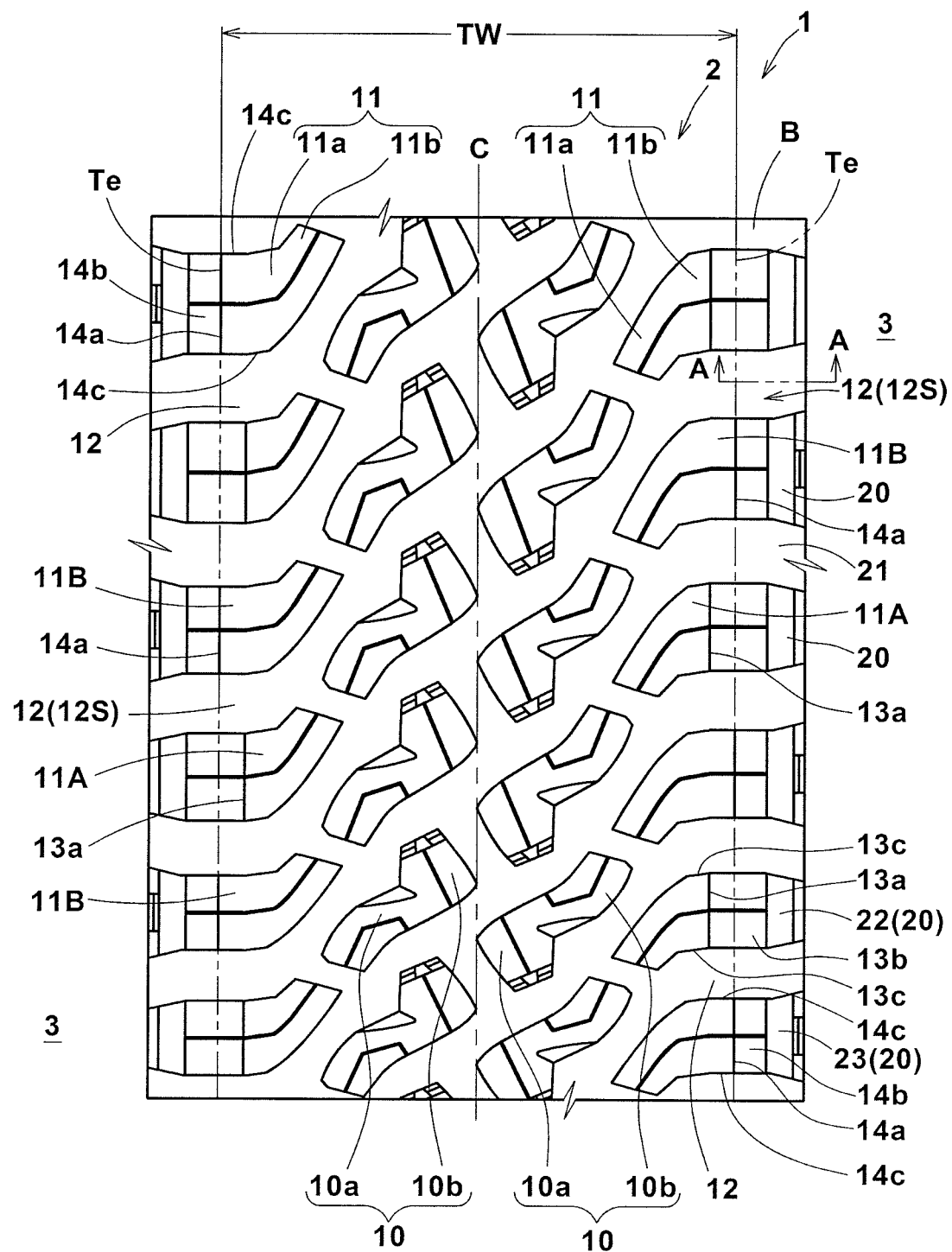
- FIG. 2 is a developed partial view of the tread portion of the pneumatic tire shown in FIG. 1.
Figure 3:
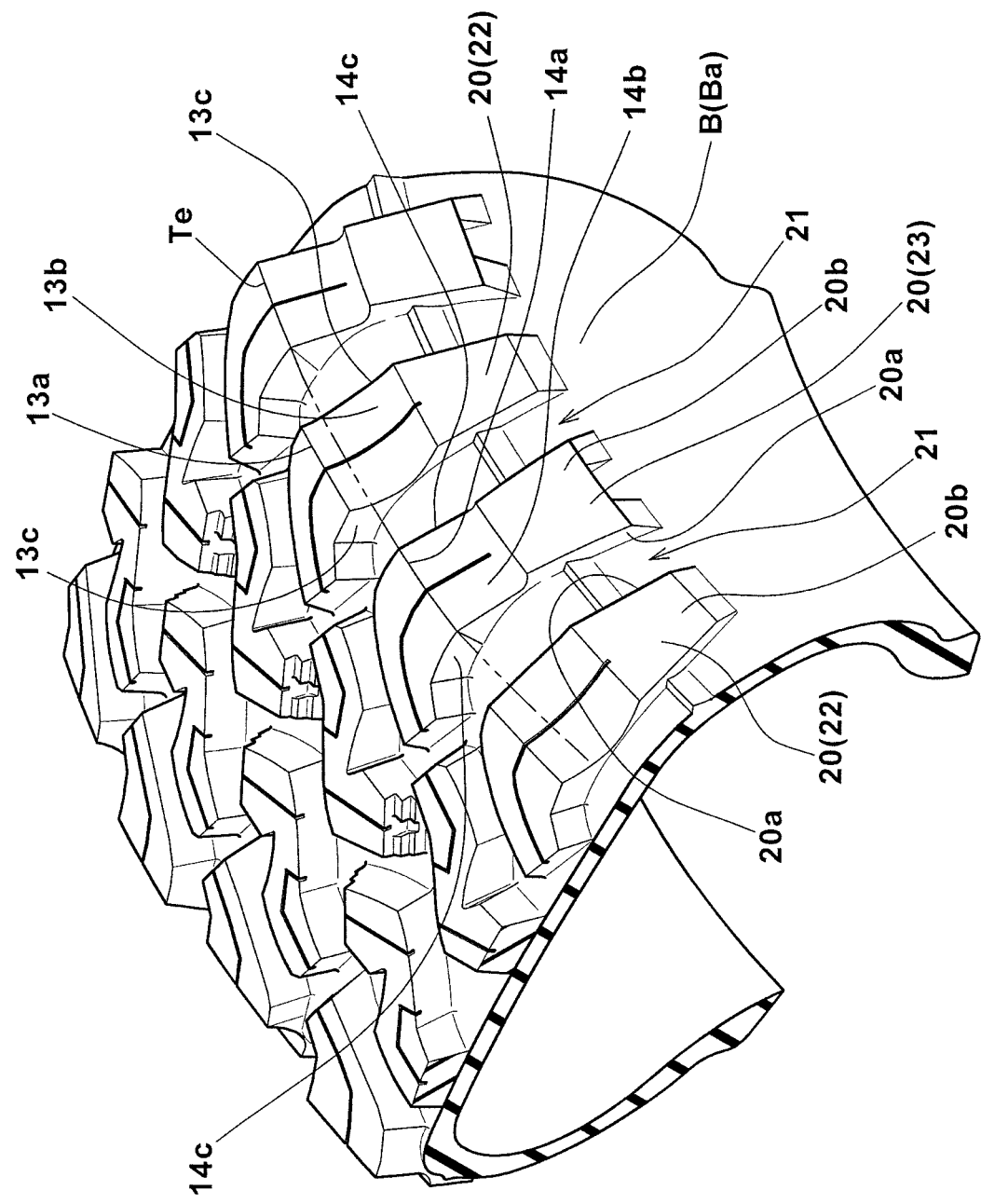
FIG. 3 is a perspective partial view of the pneumatic tire shown in FIG. 1.

In this embodiment, as shown in FIGS. 2 and 3, the tread portion 2 is provided with crown blocks 10 arranged circumferentially of the tire in two circumferential rows one on each side of the tire equator C, and shoulder blocks 11 arranged circumferentially of the tire in two circumferential rows one on axially outside each circumferential row of the crown blocks 10.

Between the shoulder blocks 11, there are formed lateral grooves 12 opened at the tread edges Te.

Each of the crown blocks 10 is composed of a first inclined portion 10a inclined to one circumferential direction toward the axially outside from the tire equator C, and a second inclined portion 10b inclined to the other circumferential direction toward the axially outside from the tire equator c so that the ground contacting surface of the crown block 10 has a V-shape (in this example L-shape) in its top view. Incidentally, the crown block 10 is not limited to such configuration.

Each of the shoulder block 11 is composed of an axial portion 11a extending axially inwardly from the tread edge Te, and an inclined portion 11b extending axially inwardly from the axial portion 11a while inclining in the same direction as the second inclined portion 10b of the crown block 10. Incidentally, the shoulder block 11 is not limited to such configuration.

The shoulder blocks 11 in this embodiment include a first shoulder block 11A and a second shoulder block 11B alternately arranged in the tire circumferential direction.

As shown in FIG. 3, the first shoulder block 11A has a ground contacting top surface which has an axially outer first edge 13a, an axially outer surface 13b extending from the first edge 13a toward the axially outside and toward the radially inside, and a pair of side wall surfaces 13c on both sides of the block in the tire circumferential direction.

The first edge 13a extends in parallel with the tire circumferential direction. In the tire axial direction, each of the side wall surfaces 13c extends axially inwardly and axially outwardly from the axial position of the first edge 13a.

The first edge 13a of the first shoulder block 11A is positioned axially inside the tread edge Te.

As shown in FIG. 3, the second shoulder block 11B has a ground contacting top surface which has an axially outer second edge 14a, an axially outer surface 14b extending from the second edge 14a toward the axially outside and toward the radially inside, and a pair of side wall surfaces 14c on both sides of the block in the tire circumferential direction.

The second edge 14a extends in parallel with the tire circumferential direction. In the tire axial direction, each of the side wall surfaces 14c extends axially inwardly and axially outwardly from the axial position of the second edge 14a.

The second edge 14a of the second shoulder block 11B is positioned at the tread edge Te, in other words, the second edge 14a forms a part of the tread edge Te.

As shown in FIG. 1, a radially outer sidewall region B, which is a radially outer region of each of the sidewall portions 3, is provided on its outer surface Ba with a plurality of axially outwardly protruding side protectors 20 which are arranged at intervals in the tire circumferential direction so that a grooved portion 21 is are formed between every two of the circumferentially adjacent side protectors 20. Therefore, the tire 1 can exert traction by the engagement between the side protectors 20 and rocks as well as by the shearing of the mud entered in the grooved portions 21. In addition, the side protectors 20 can prevent the grooved portions 21, where the rubber thickness is relatively small, from being hit by rocks and the like to suppress the occurrence of cut damage while ensuring a necessary rubber thickness. Therefore, the off-road performance and the cut resistance performance can be improved.

Incidentally, the contour line s of the radially outer sidewall region B is smoothly continued to the contour line of the bottom 12S of the lateral groove 12 as shown in FIG. 1.

As shown in FIG. 3, the side protector 20 has an axially outer surface 20b and a pair of side wall surfaces 20a extending axially inwardly from the axially outer surface 20b toward the above-mentioned outer surface Ba on both sides in the tire circumferential direction of the side protector 20.

Between the opposite side wall surfaces 20a of every two of the circumferentially adjacent side protectors 20, a grooved portion 21 is formed. The side wall surfaces 20a are smoothly continued to the side wall surfaces 13c, 14c of the first and second shoulder blocks 11A, 11B.

The radially outer edge 20t of the axially outer surface 20b extends in parallel with the tire circumferential direction. The above-mentioned axially outer surface 13b/14b of the first/second shoulder block 11A/11B intersects with the axially outer surface 20b at the radially outer edge 20t.

Figure 4:
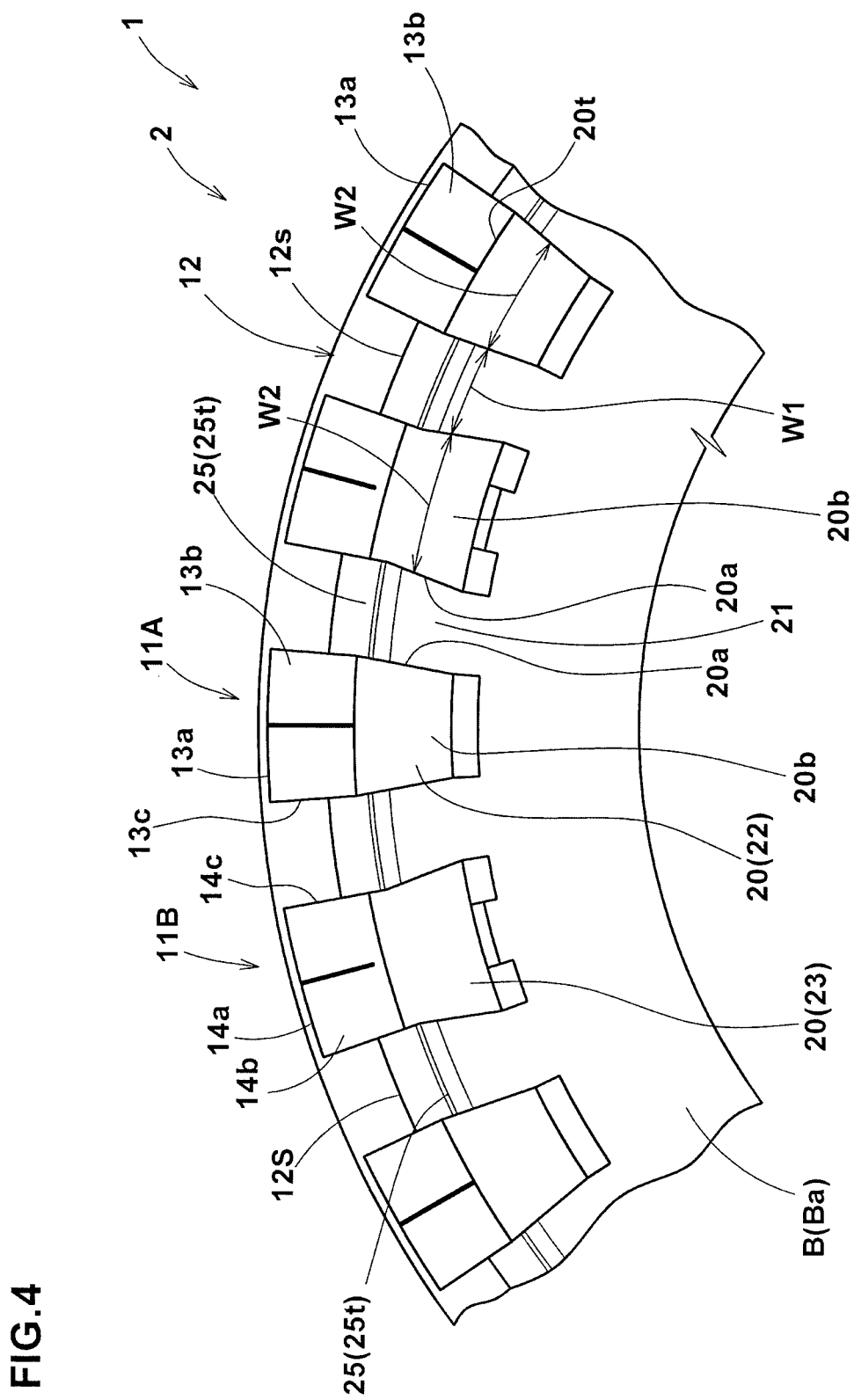
FIG. 4 is a partial side view of the radially outer region of the sidewall portion of the pneumatic tire shown in FIG. 1.

As shown in FIG. 4, when each of the side protectors 20 and one of the grooved portions 21 on each side of the concerned side protector 20 are measured at the same radial position within the axially outer surfaces 20b, the width W1 in the tire circumferential direction of the grooved portion 21 is preferably set in a range from 50% to 70% of the width W2 in the tire circumferential direction of the side protector 20.

If the width W1 is less than 50% of the width W2, the volume of the side protectors 20 is increased, therefore, the rubber volume and mass of the tire 1 is increased in the radially outer sidewall region B. As a result, the flexural stress of the sidewall portion concentrates in a region from the lower sidewall portion to the bead portion, and there is a possibility that the durability of the bead portion 4 is deteriorated.

If the width W2 is more than 70% of the width W1, the volume of the side protectors 20 is decreased. As a result, the traction due to the engagement between the side protectors 20 and rocks and the traction due to the shearing of the mud in the grooved portions 21 become decreased.

As shown in FIG. 1, the protruding height H1 of the side protector 20 is substantially constant, namely, the difference between the maximum and minimum of the protruding height H1 is at most 20% of the maximum of the protruding height H1.

The cross sectional shape of the side protector 20 is a substantially rectangle or trapezoid in a tire meridian section including the side protector 20. However, the side protector 20 is not limited to such configuration, and various shapes may be employed.

The protruding height H1 of the side protector 20 is preferably set in a range from 5 to 10 mm measured at the axially outer surface 20b.

If the protruding height H1 is less than 5 mm, since the volume of the mud entering in the grooved portions 21 becomes small, the shearing force of the mud is decreased, and the engaging force with the rocks is reduced. Thus, there is a possibility that the off-road performance and cut resistance performance can not be effectively improved.

If the protruding height H1 is more than 10 mm, the volume of the radially outer sidewall region B is increased, and there is a possibility that the durability of the bead portion 4 is deteriorated.

The side protectors 20 have to be disposed radially outside the tire maximum width position Pm in order that the cut resistance performance and off-road performance are exhibited. The tire maximum width position Pm is the radial position at which the above-mention contour line s mostly axially outwardly protrudes. Usually, the tire maximum width position Pm occurs at about one half of the tire section height from the bead base line. Instead of the tire maximum width position Pm, the maximum width position of the carcass can be used.

In order to improve the off-road performance and the durability of the bead portion 4 in a good balance, it is preferred that a length La (shown in FIG. 5) in the tire radial direction of the axially outer surface 20b of the side protector 20 is set in a range from 1.5 to 3 times the groove depth D (shown in FIG. 1) of the transverse grooves 12, and the radially outer edge 20t of the axially outer surface 20b is positioned in a range between 80% and 90% of the tire section height from the bead base line.

It is preferable that the side protectors 20 are connected to the respective shoulder blocks 11 in order to form rigid traction members from the tread shoulders to upper (radially outer) sidewalls of the tire and thereby to improve the off-road performance. In this embodiment, therefore, as shown in FIG. 4, the side protectors 20 include two types: a first protector 22 connected, at the outer edge 20t, with the side surface 13b of the first shoulder block 11A, and a second protector 23 connected, at the outer edges 20t, with the side surface 14b of the second shoulder block 11B.

As shown in FIG. 4, the width W1 in the tire circumferential direction of the first protector 22 is gradually decreased toward the radially inside of the tire, whereas the width W1 in the tire circumferential direction of the second protector 23 is gradually increased toward the radially inside of the tire.

Since a radially outer part of the first protector 22 which is more likely to contact with the rocks has a larger volume, the first protector 22 can exert a large tractional force upon contact with the rocks. On the other hand, a radially inner part of the first protector 22 is decreased in the mass. As a result, the tire 1 can exhibit an excellent rock performance while suppressing the increase in the mass of the first protectors 22.

The second protectors 23 and the first protectors 22 are alternately arranged in the tire circumferential direction. As a result, the grooved portions 21 formed therebetween are, as shown in FIG. 4, inclined with respect to the respective tire radial directions to both sides in the tire circumferential direction alternately. Such grooved portions 21 can further improve the off-road performance.

In the first protector 22 in this embodiment, the axially outer surface 20b has a radially inner edge from which a radially inner surface of the first protector 22 extends radially inwardly and axially inwardly.

In the second protector 23 in this embodiment, the axially outer surface 20b has a radially inner edge from which a radially inner surface of the second protector 23 extends radially inwardly and axially inwardly.

The second protector 23 in this embodiment is provided in the radially inner surface with a reentrant part.

As a result, on the radially inside of the radially inner edge, the second protector 23 is branched into two parts, although the first protector 22 is not branched. Such second protector 23 can increase the traction by the increases edges.

Figure 5:
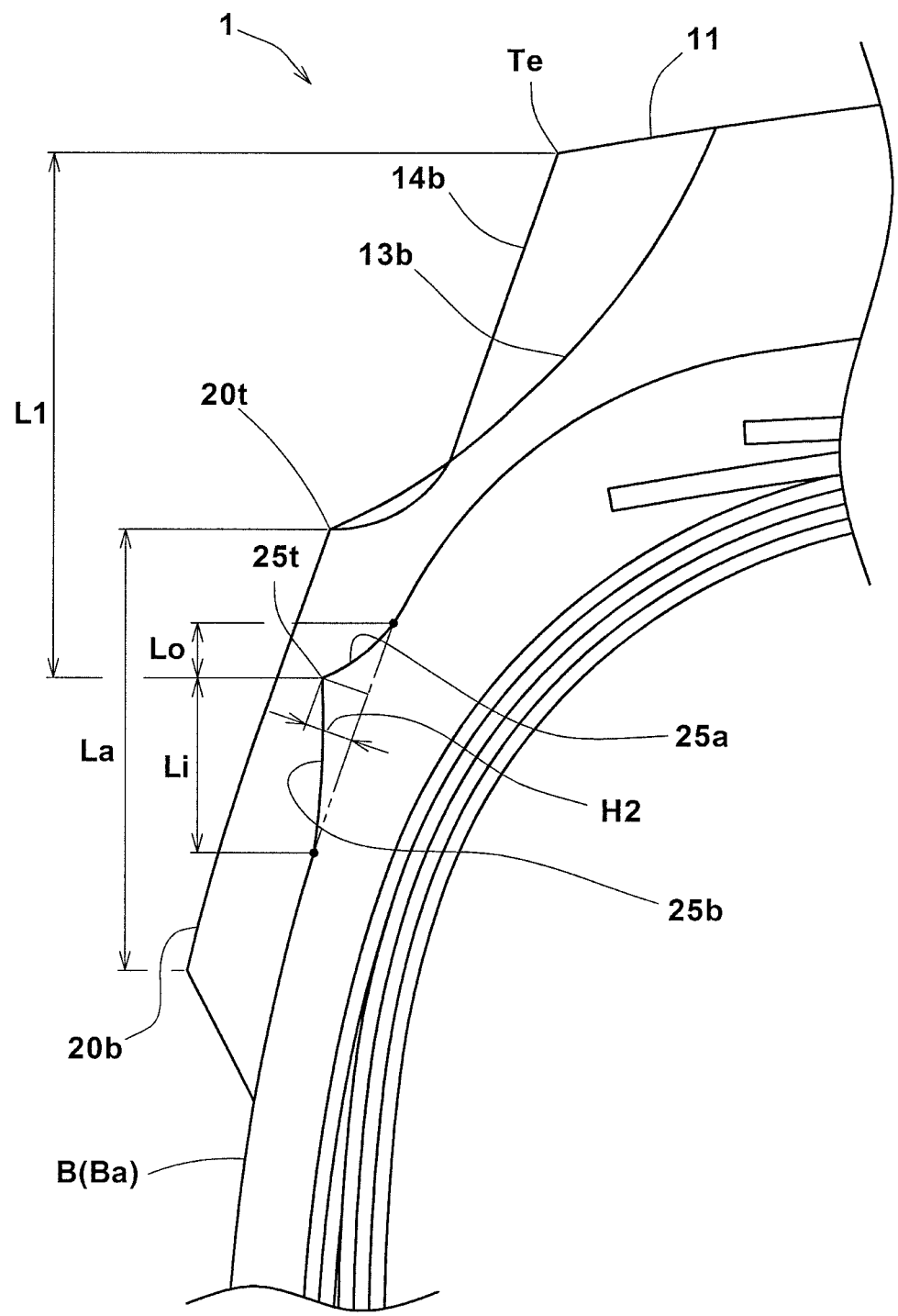
FIG. 5 is an enlarged cross sectional view showing the radially outer region of the sidewall portion the pneumatic tire shown in FIG. 1.

In this embodiment, each of the grooved portions 21 between the side protectors 20 is provided with a projection 25 as shown in FIG. 5. In a tire meridian section including the projection 25, the projection 25 has a substantially triangular shape having an apex 25t projecting axially outwardly. Such projection 25 can secure the rubber thickness in the grooved portion 21 to effectively increase the cut resistance performance, while suppressing the increase in the mass of the radially outer sidewall region B to prevent the deterioration of the durability of the bead portion 4.

The above-mentioned triangular shape of the projection 25 has a radially outer oblique side 25a extending radially outwardly from the apex 25t, and a radially inner oblique side 25b extending radially inwardly from the apex 25t.

The outer and inner oblique sides 25a and 25b are merged into the contour s of the sidewall portion 3. In other words, the protruding height of the projection 25 gradually decreases to zero toward the radially inside and outside from the apex 25t.

It is preferable that the radial distance L1 between the apex 25t and the tread edge Te is set in a range from 20 to 50 mm. If cuts occur in a region between 0 mm and 20 mm from the tread edge Te in the tire radial direction, as the rubber thickness of such region is considerably large, the traveling performance is not affected in effect. On the other hand, a region radially inside a position 50 mm from the tread edge Te in the tire radial direction is less likely to contact with rocks, shrubs and like. Therefore, even if the apex 25t is disposed at a position less than 20 mm or more than 50 mm from the tread edge Te in the tire radial direction, the effect of improving the cut resistance performance can not be expected.

If the protruding height H2 of the projection 25 at the apex 25t is greater than the protruding height H1 of the side protector 20, since the amount of mud entering in the grooved portions 21 is reduced, there is a possibility that mud performance is deteriorated. It is therefore preferable that the protruding height H2 is less than the protruding height H1. The protruding height H2 of the projections 25 is preferably in a range from 2 to 8 mm.

In order to improve the cut resistance performance, in this embodiment, the apex 25t, namely edge, of the projection 25 extends in the tire circumferential direction continuously between the side protectors 20 on both sides thereof. And the protruding height H2 of the projection 25 at the apex 25t or edge is constant along the edge (apex).

The cross-sectional shape of the projection 25 (in this embodiment, triangular shape) is constant in the tire circumferential direction.

However, the cross-sectional shape and the protruding height H2 at the apex 25t may be varied. For example, the protruding height H2 may be gradually increased toward a central position from both end positions of the projection 25 in the tire circumferential direction. In this case, it may be possible to further improve the durability of the bead portion 4.

Preferably, the length Li in the tire radial direction of the radially inner oblique side 25b is set to be greater than the length Lo in the tire radial direction of the radially outer oblique side 25a. As a result, the angle with respect to the tire axial direction of the radially inner oblique side 25b becomes smaller than the angle with respect to the tire axial direction of the radially outer oblique sides 25a, and the stiffness in the tire radial direction of the projection 25 can be increased. Thus, the cut resistance performance can be improved while suppressing the weight increase due to the projections 25.

It is preferable that, as shown in FIG. 5, the length in the tire radial direction of the projection 25 (=Li+Lo) is less than the length La in the tire radial direction of the outer surface 20b of the side protector 20 in order not to hinder the improvement of the cut resistance performance. For a good balance between the improvement of the cut resistance performance and the improvement of the off-road performance, the length (=Li+Lo) of the projection 25 is preferably set in a range from 35% to 65% of the length La of the outer surface 20b.

while detailed description has been made of a preferable embodiment of the present invention, the present invention can be embodied in various forms without being limited to the illustrated embodiment.

Comparison Tests

Based on the internal structure shown in FIG. 1 and the tread pattern shown in FIG. 2, pneumatic tire of size 265/70R17 were experimentally manufactured as test tires and tested for the off-road performance (rock performance and mud performance), cut resistance performance, and bead durability.

The test tires (including Comparative examples Re1-Re2 and working examples Ex1-Ex16) had the same structure except for side protectors and projections, specifications of which are listed in Table 1.

<Rock Performance and Mud Performance>

Using a 2500 cc 4WD car provided on all wheels with test tires, the rock performance and mud performance during running on a rocky ground surface and muddy ground +surface of a test course were evaluated by a test driver based on running characteristics, e.g. traction, braking and the like.

The results are indicated in Table 1 by an index based on Comparative Example Re1 being 100, wherein the larger value is better.

<Cut Resistance Performance>

Using the above-mentioned test car, after running for about 1500 km on the rocky ground surface, the grooved portions between the side protectors were checked, and the cut resistance was evaluated based on the length and depth of cuts occurred in the grooved portions.

The results are indicated in Table 1 by an index based on Comparative Example Ret being 100, wherein the greater the numerical value, the better the cut resistance performance.

<Bead Durability>

Using an indoor tire test machine, each test tire was run for 24 hours at 100 km/h (tire pressure 350 kPa, tire load 100% of the above-mentioned standard load), and the surface temperature of the bead portion was measured.

The results are indicated in Table 1 by an index based on Comparative Example Re1 being 100, wherein the greater the numerical value, the better the durability.

TABLE 1

| Tire | Re1 | Ex1 | Ex2 | Ex3 | Re2 | Ex4 | Ex5 | Ex6 | Ex7 |
|---|---|---|---|---|---|---|---|---|---|
| W1/W2(%) | 45 | 50 | 60 | 70 | 75 | 60 | 60 | 60 | 60 |
| La(mm) | 35 | 35 | 35 | 35 | 35 | 15 | 20 | 50 | 55 |
| H1(mm) | 7 | 7 | 7 | 7 | 7 | 7 | 7 | 7 | 7 |
| H2(mm) | 5 | 5 | 5 | 5 | 5 | 5 | 5 | 5 | 5 |
| Cut resistance | 130 | 125 | 120 | 110 | 100 | 110 | 120 | 120 | 110 |
| Rock performanc | 100 | 110 | 120 | 110 | 100 | 115 | 120 | 120 | 115 |
| Mud performance | 100 | 110 | 120 | 110 | 100 | 115 | 120 | 120 | 115 |
| Bead durability | 100 | 110 | 120 | 125 | 130 | 115 | 120 | 120 | 120 |

TABLE 1-continued

| Tire | Ex8 | Ex9 | Ex10 | Ex11 | Ex12 | Ex13 | Ex14 | Ex15 | Ex16 |
|---|---|---|---|---|---|---|---|---|---|
| W1/W2(%) | 60 | 60 | 60 | 60 | 60 | 60 | 60 | 60 | 60 |
| La(mm) | 35 | 35 | 35 | 35 | 35 | 35 | 35 | 35 | — |
| H1(mm) | 3 | 5 | 10 | 13 | 7 | 7 | 7 | 7 | 7 |
| H2(mm) | 5 | 5 | 5 | 5 | 1 | 2 | 8 | 10 | — |
| Cut resistance | 115 | 120 | 120 | 125 | 115 | 120 | 120 | 125 | 110 |
| Rock performance | 120 | 120 | 120 | 120 | 120 | 120 | 120 | 120 | 115 |
| Mud performance | 120 | 120 | 120 | 120 | 120 | 120 | 120 | 120 | 115 |
| Bead durability | 125 | 120 | 120 | 115 | 125 | 120 | 120 | 115 | 125 |

From the test results, it was confirmed that, as compared with Comparative Example tires, working Example tires were improved in the durability of the bead portion, the off-road performance, and the cut resistance performance in a good balance.

DESCRIPTION OF THE REFERENCE SIGNS 1 pneumatic tire
3 sidewall portion
20 side protector
21 grooved portion
B radially outer region of sidewall portion
Ba outer surface of radially outer region

The invention claimed is:

1. A pneumatic tire comprising
a sidewall portion provided in its radially outer region thereof with side protectors protruding axially outwardly from the outer surface of the radially outer region,
the side protectors arranged in the tire circumferential direction at intervals so that a grooved portion is formed between every two of the circumferentially adjacent side protectors, wherein
a length in the tire circumferential direction of said grooved portion is in a range of from 50% to 70% of a length in the tire circumferential direction of the side protector on each side of said grooved portion when the lengths are measured at the same radial position, and
each of the grooved portions is provided with a single projection, wherein
said projection projects axially outwardly from the outer surface of the radially outer region of the sidewall portion, and a protruding height thereof measured in a tire meridian section including the projection is less than a protruding height of the side protector on each side thereof measured in a tire meridian section including the side protector,
wherein
in a tire meridian section including the grooved portion, said projection has a substantially triangular shape having a single apex which is a pointed top, the substantially triangular shape having a radially outer oblique side extending radially outwardly from the single apex, and a radially inner oblique side extending radially inwardly from the single apex, and
the length Li in the tire radial direction of the radially inner oblique side is greater than the length Lo in the tire radial direction of the radially outer oblique side.

2. The pneumatic tire according to claim 1, wherein a distance in the tire radial direction between said single apex and the adjacent tread edge is in a range from 20 to 50 mm.

3. The pneumatic tire according to claim 1, wherein the single apex of said projection extends in the tire circumferential direction continuously between the side protectors on both sides of said projection so as to form a ridge line extending therebetween.

4. The pneumatic tire according to claim 1, wherein said projection has a protruding height in a range from 2 to 8 mm.

5. The pneumatic tire according to claim 1, wherein the side protectors have protruding heights in a range from 5 to 10 mm.

6. The pneumatic tire according to claim 1, wherein the radially outer edges of the axially outer surfaces of the side protectors are positioned at a radial height between 80% and 90% of the tire section height from the bead base line.

7. The pneumatic tire according to claim 6, wherein the axially outer surfaces of the side protectors have a length La in the tire radial direction, and the projections have a length in the tire radial direction which is less than the length La in the tire radial direction.

8. The pneumatic tire according to claim 1, wherein
the radially outer oblique side extends radially outwardly from the single apex so as to have a radially outer end positioned radially inside the radially outer edges of the axially outer surfaces of the side protectors, and
the radially inner oblique side extends radially inwardly from the single apex so as to have a radially inner end positioned radially outside the radially inner edges of the axially outer surfaces of the side protectors.

9. The pneumatic tire according to claim 2, wherein
the tread portion is provided with transverse grooves opened at the tread edge and having a groove depth D,
the grooved portions between the side protectors are respectively continued from the transverse grooves, and
the axially outer surfaces of the side protectors have a length in the tire radial direction which is in a range from 1.5 to 3 times the groove depth D of the transverse grooves.

* * * * *